May 23, 1944.  R. T. HOSKING  2,349,593
SELF-LOCKING SCREW DEVICE
Filed June 18, 1940  2 Sheets-Sheet 1
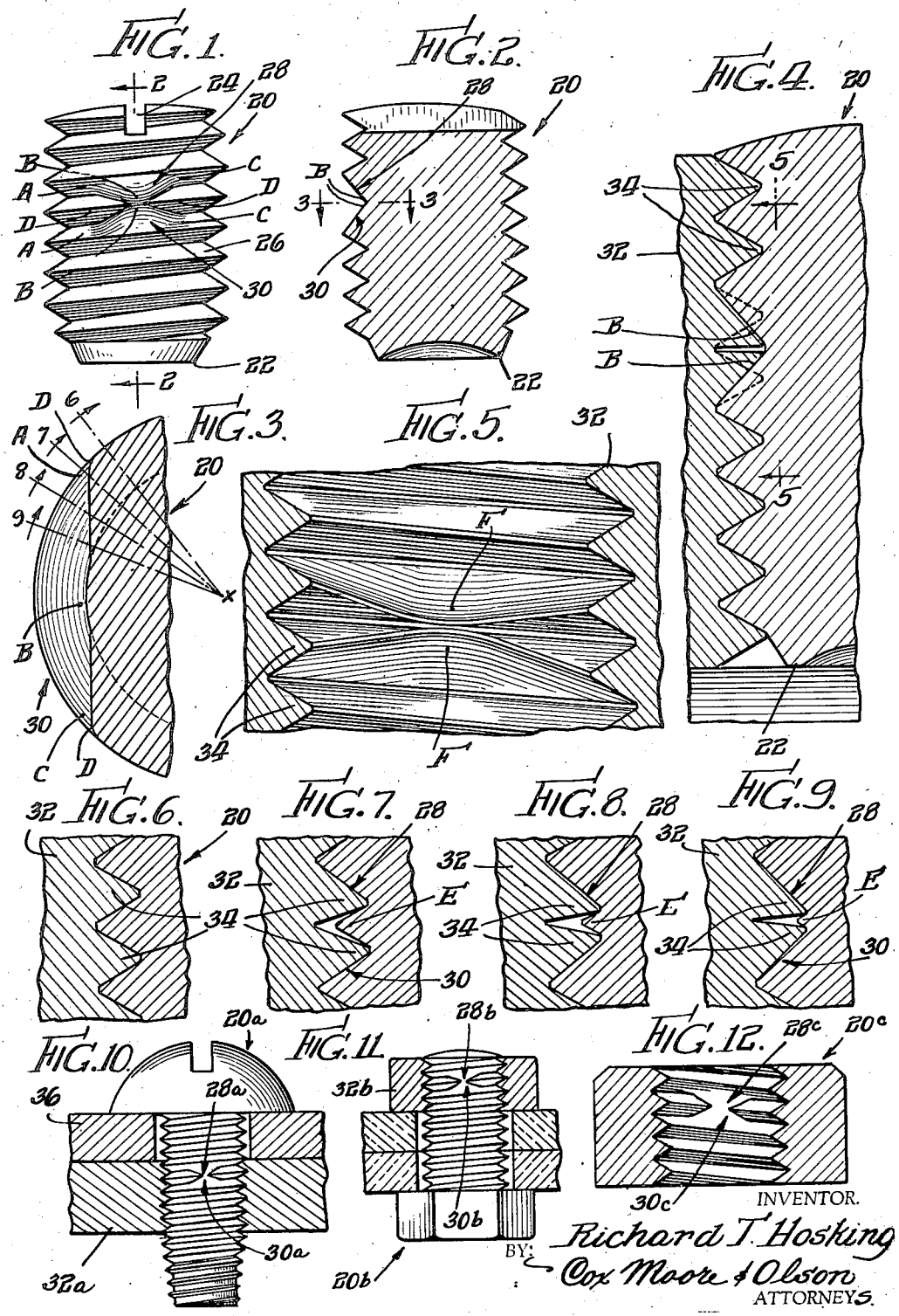
INVENTOR.
Richard T. Hosking
BY Cox Moore & Olson
ATTORNEYS.

May 23, 1944.  R. T. HOSKING  2,349,593
SELF-LOCKING SCREW DEVICE
Filed June 18, 1940  2 Sheets-Sheet 2
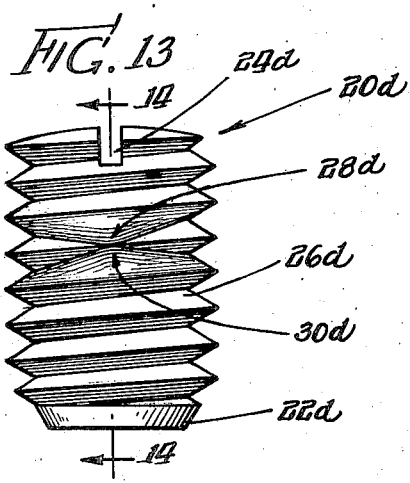
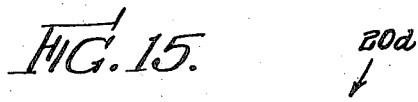
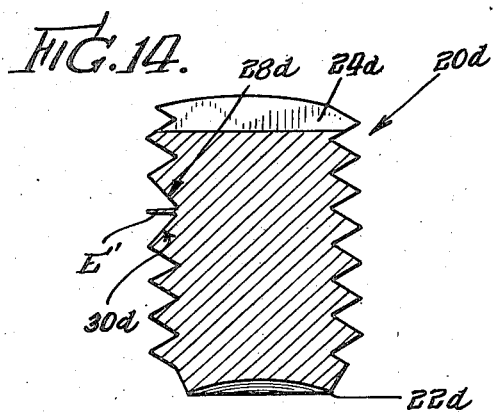
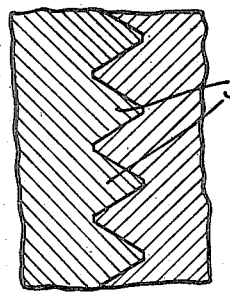
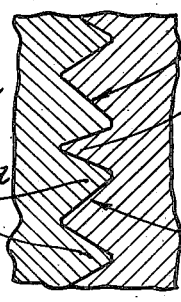
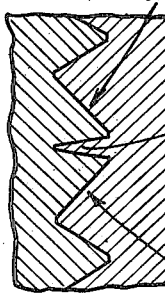
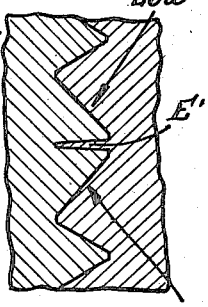
INVENTOR.
Richard T. Hosking
BY: Cox Moore & Olson
ATTORNEYS.

Patented May 23, 1944

2,349,593

UNITED STATES PATENT OFFICE 2,349,593

SELF-LOCKING SCREW DEVICE

Richard T. Hosking, Wilmette, Ill., assignor, by mesne assignments, to Illinois Tool Works, Chicago, Ill., a corporation of Illinois Application June 18, 1940, Serial No. 341,130

4 Claims. (Cl. 151—22)

This invention relates generally to self-locking screw threaded devices and more particularly to devices wherein the self-locking feature is embodied in the thread structure thereof.

Screw and nut locking devices which depend for their locking effectiveness upon the engagement of a locking tooth or element with the surface of the work present certain functional disadvantages. In the first place, such devices are not locked in place until the head has been brought into juxtaposition with respect to the work, and secondly, locking can only be accomplished by the disfigurement or displacement of a portion of the work surface. Thus, in instances where any scraping or indentation of the work surface is not permissible, such locking devices cannot be used. Likewise, in applications requiring relatively thin stock, as, for example, in the fabrication of aeroplanes employing relatively soft sheet metal, locking devices which produce indentations in the work surface cannot be used. The present invention contemplates a thread locking device which avoids the difficulties enumerated above by providing means in association with the thread convolutions of one element for distorting or displacing a complementary thread convolution in a companion threaded element.

More specifically, the invention contemplates the provision of means in association with the base of the thread in one threaded element for laterally or axially displacing the top of the thread in a companion element during the relative rotation of the parts whereby to secure said parts against inadvertent relative rotation.

Still more specifically, the invention contemplates a thread locking arrangement whereby the outer portions of adjacent thread convolutions in one threaded element are automatically displaced toward each other by means provided on a companion threaded element in response to relative rotation of said elements to thereby set up a firm thread interlock which will prevent said elements against inadvertent relative rotation.

It is a further object of the present invention to provide thread locking means as specified above which are capable of being produced by the use of thread rolling dies which are configurated to form locking sections contemporaneously with the formation of the thread convolutions.

The foregoing and numerous other objects and advantages will be more apparent from the following detailed description when considered in connection with the accompanying drawings, wherein—

Fig. 1 is a side elevational view of a set screw equipped with locking sections contemplated by the present invention;

Fig. 2 is a vertical transverse sectional view of the screw shown in Fig. 1 taken substantially along the line 2—2 of Fig. 1;

Fig. 3 is an enlarged fragmentary sectional view taken substantially along the line 3—3 of Fig. 2 to more clearly illustrate the structural arrangement of the locking sections of the screw shown in Figs. 1 and 2;

Fig. 4 is an enlarged fragmentary sectional view of the set screw similar to the section shown in Fig. 2, said screw being shown in operative association with the thread convolutions of a work piece to illustrate the manner in which the locking sections on the set screw serve in response to rotary movement experienced by the set screw to shift sections of adjacent thread convolutions toward each other to produce a thread interlock;

Fig. 5 is a view of the internal thread of the work piece as viewed along the line 5—5 of Fig. 4 with the screw disassociated from the work piece to more clearly illustrate the manner in which the aforesaid sections of adjacent thread convolutions in the work are shifted toward each other when said sections are engaged by the locking sections of the set screw;

Figs. 6 to 9, inclusive, are views taken progressively along the lines 6—$x$, 7—$x$, 8—$x$ and 9—$x$, respectively, of Fig. 3, said views being taken when the set screw is operatively associated with the thread convolutions of the work piece;

Fig. 10 discloses the invention of Figs. 1 to 9, inclusive, applied to a headed screw, such as a hardened thread forming screw;

Fig. 11 discloses the invention as applied to a bolt, the nut associated with the free side of the bolt shank corresponding functionally with the work pieces shown in Figs. 4 and 10;

Fig. 12 discloses the application of the locking sections of the previous figures with the internal thread of a nut;

Fig. 13 is a view similar to Fig. 1 disclosing a screw having locking sections of slightly modified form;

Fig. 14 is a vertical sectional view taken substantially along the line 14—14 of Fig. 13;

Fig. 15 is an enlarged fragmentary vertical sectional view of the screw as shown in Fig. 14 in operative association with the work piece; and Figs. 6a to 9a, inclusive, correspond respectively with Figs. 6 to 9, inclusive, in that they are taken along the same lines, only with respect to the screw shown in Figs. 13 to 15, inclusive.

Referring now to the drawings more in detail, wherein like numerals have been employed to designate similar parts throughout the various figures, it will be seen that for purposes of illustration I have shown the invention as applied to a set screw 20, Figs. 1 and 2. This set screw 20 has a conventional entering end 22 and a transverse slot 24 at the opposite extremity for receiving a suitable turning tool. Screw threads 26 extend over the entire length of the screw body except for adjacent locking sections designated generally by the numerals 28 and 30. Each of these locking sections 28 and 30 includes a thread shifting or displacing portion or bulge. These locking sections or humps 28—30 approximately begin at the points designated by the letter A, Figs. 1 and 3, extending circumferentially to their point of maximum bulge at B and then diminishing again to zero bulge at the points C. Stating it another way, these locking sections or humps 28—30 diverge laterally or axially of the screw toward each other out of helical alignment with the normal thread convolution. The point of maximum divergence from the normal helical surface of the thread convolution has been designated by the letter B and this point is located at the root of the thread. That is to say, there is no thread distortion or misalignment along the crest of the thread convolutions from which the locking sections 28—30 diverge.

It will also be noted that in order to provide the locking sections or humps 28—30, material of the screw body is employed which would otherwise be used to complete the section of the thread convolution in the vicinity of said locking sections. Taking away this material to form the locking sections or bulges 28—30 causes the crown of the thread convolution beginning at the points D, Figs. 1 and 3, to diminish in height as they approach each other. Zero height is reached at the point of maximum bulge B of the locking sections.

With the foregoing understanding of the structural arrangement of the screw, we now turn to the effect which is produced by the locking sections upon the thread in the work. Assume that the entering portion of the set screw 20 is initially applied to the threaded aperture of a work piece 32. The screw turns easily into the work until the locking sections 28—30 are brought into association with the complementary threads 34 of the work piece. The effect produced upon the thread in the work is best illustrated in Figs. 6 to 9, inclusive. Before the locking sections or misaligned portions 28—30 move into engagement with complementary sections of the thread 34 of the work, full thread engagement as illustrated in Fig. 6 takes place. Continual rotation causes the locking sections 28—30 to successively act upon the thread in the work so as to ultimately bring the crown or crest of the sections in the adjacent convolutions of the work together. The position of maximum displacement of the thread convolutions of the work is illustrated in Fig. 4, at which time the points B of maximum misalignment of the locking sections engage the work thread. As the screw continues to rotate, these previously displaced sections of the work thread are returned to normal helical alignment with the thread convolutions of the screw. In other words, as the sections 28—30 initially engage the threads of the work they exert a compressing or closing action about the thread sections indicated by the letter E, Figs. 7 to 9, inclusive, and as the trailing side of the locking sections 28—30 moves into the work the corresponding thread portions E cause the adjacent thread convolutions of the work to be urged away from each other from the position shown in Fig. 4 to the position shown in Fig. 6. In other words, the action which takes place at the advancing side of the locking sections is reverse to the action which occurs at the trailing side.

In Fig. 5 I have shown the portions of the thread of the work which have been pushed together or toward each other by the action of the locking sections 28—30, these portions being designated generally by the letter F. These deflected portions F coact with the portion of the thread positioned between the points D, Figs. 1 and 3, in preventing inadvertent rotation of the screw. In other words, the deflected portions F present an enveloping obstacle which must be forced back into normal helical alignment before the screw can rotate. This obstruction or locking effect functions to prevent rotation of the screw in either direction.

In Fig. 10 the invention just described has been disclosed in association with a hardened thread forming screw designated generally by the numeral 20a. The screw 20a is shown in operative association with a work piece 32a and is provided with locking sections 28a—30a which correspond structurally with the locking sections 28—30 previously described. The head of the screw 20a serves to hold a plate or sheet 36 against the companion surface of the work 32a.

Fig. 11 discloses the application of the invention to a bolt designated generally by the numeral 20b. This bolt is provided with locking sections 28b—30b which cooperate with a nut 32b to prevent retrograde rotation thereof. In other words, the nut 32b is functionally similar to the work 32 and 32a previously described.

Fig. 12 discloses the application of the locking principle heretofore described to a nut which is designated generally by the numeral 20c. The internal thread of this nut 20c is provided with locking sections 28c—30c.

In Figs. 13 to 15, inclusive, I have shown a slightly modified thread locking arrangement. A set screw 20d is disclosed which is similar to the set screw 20 previously described. This screw is provided with the same entering end 22b and recess 24d for receiving a suitable turning tool such as a screw driver. The thread 26d corresponds with the thread 26 previously described in connection with the screw 20. The screw 20d is provided with locking sections 28d—30d which correspond structurally with the locking sections 28—30 previously described. The only structural difference in the locking arrangement of the screw 20d over the screw 20 is that the crest of the thread interposed between the locking sections 28d and 30d maintains its height but decreases in width. In the screw 20 previously described the thread in this vicinity decreases from the full height at the points D to zero height at the points B.

Fig. 15 is similar to Fig. 4 in disclosing the manner in which the locking sections function to close together adjacent sections of thread convolutions in the work. It will be noted that Fig. 15 differs from Fig. 4 in the presence of thread stock between the displaced sections of the screw thread. In Fig. 4 the thread stock blends into the root of the screw 20 and therefore no material of the thread is present between the central portions of the deflected work threads.

Figs. 6a to 9a, inclusive, are similarly to Figs.

6 to 9, respectively, previously described. These figures have been shown to more clearly illustrate how the portion E' between the deflected portions of the work thread maintains its height but diminishes in cross-section toward the central portion of the bulge or locking sections 28d—30d.

From the foregoing it will be apparent that the present invention contemplates a thread locking device of extremely simple construction yet most efficiently operative to prevent retrograde relative rotation between companion threaded elements of the type disclosed herein. Obviously, the above described locking sections may vary in circumferential as well as axial extent, depending upon the environment in which the invention is to be used. Thus, in some instances it may be advantageous to require less axial displacement of the work thread, in which case the degree of bulge might be considerably less than that disclosed herein. In the disclosed embodiment substantially complete displacement of the adjacent thread portions toward each other is attained. In some instances it may be desirable to require a considerably less degree of axial displacement than that shown herein. Likewise the abruptness of the bulge or hump may be varied to suit the particular work which is to be performed. To decrease the abruptness of the bulge it is only necessary to increase the circumferential extent thereof and in some instances it may be desirable to have a very gradual rise so as to impart a corresponding gradual displacement of the thread in the work. The locking sections disclosed herein may be formed by simple and expeditious thread rolling operations. I have found it practical to employ conventional thread rolling dies equipped at spaced intervals with sections particularly designed to form the locking sections simultaneously with the thread rolling operation. The present invention, however, is not concerned with the method or mechanism for producing the locking sections but is directed more specifically to the element or screw device in which the locking sections are incorporated.

It will also be apparent that the present invention presents other advantages over conventional locking devices of the type designed to lock against the surface of the work. Thus, it is unnecessary to clamp the screw head against the work surface to produce the desired locking effect. As long as the locking sections operatively engage the work threads, the screw will stay put in any desired position. That is to say, even though the screw may not be completely inserted within the work piece, it may be retained in this partially inserted position if it is so desired. In instances where screws are used to project beyond a surface a predetermined amount, their position of adjustment may be maintained by the principle of interlock described herein.

Attention is also directed to the fact that the locking sections described herein are so arranged that the force required to shift the thread in the work is applied in the strongest vicinity of the screw thread, namely, at the root thereof. In the embodiment of the invention disclosed herein the portion of the locking section in the screw which does the maximum amount of thread shifting or displacing in the work is located adjacent the root of the screw thread as distinguished from the crest thereof. This stronger portion acts upon the weaker or crest portion of the thread in the work and thereby causes a shifting of the work thread without any disfigurement or displacement of the material of the locking section. While in the present embodiment the degree of work thread displacement is such as to exceed the elastic limit of the work material, the degree of displacement may be controlled so as to only shift the work material a slight amount within its elastic limit if such an arrangement is desired. In other words, the form, extent, et cetera, of the locking sections may be modified to meet any particular need incident to its use without departing from the spirit of the present invention. While I have found it advantageous to harden threaded devices equipped with the locking sections herein described, the invention is not limited in its application to hardened screw devices.

While certain specific structural devices have been described herein it will be apparent that numerous changes and modifications thereto may be made without departing from the scope of the appended claims.

The invention is hereby claimed as follows:

1. A self-locking screw threaded device including a threaded body, and a locking portion including a rigid thread shifting section offset from the normal helical contour and adjacent the base of a thread convolution of said body and a second adjacently positioned rigid thread shifting section offset from the normal helical contour and adjacent the base of another thread convolution of said body in a direction opposite from the first mentioned section, said thread shifting sections adapted when rotatably associated with a complementary threaded member to contemporaneously effect axial displacement toward each other of adjacent portions of adjacent thread convolutions in said complementary member so as to increase resistance of the engaged thread areas to relative retrograde rotation, each of said rigid thread shifting sections and the thread portion from which it is offset presenting in combined transverse cross-section an area greater than the cross-sectional area of the normal thread convolution.

2. A self-locking screw threaded device including a threaded body, and a locking portion including a rigid thread shifting section offset from the normal helical contour of a thread convolution of said body at the base thereof and a second opposite rigid thread shifting section offset from the normal helical contour of an alternately positioned thread convolution of said body at the base thereof in a direction opposite from the first mentioned section, said thread shifting sections being adapted when rotatably associated with a complementary threaded member to effect axial displacement toward each other of opposite portions of adjacent thread convolutions in said complementary member so as to increase resistance of the engaged thread areas to relative rotation.

3. A self-locking screw threaded device including a threaded body, and a locking portion including a rigid thread shifting section offset from the normal helical contour of a thread convolution of said body and a second adjacently disposed thread shifting section offset from the normal helical contour of another convolution of said body in a direction opposite from the first mentioned section, said thread shifting sections adapted when rotatably associated with a complementary threaded member to contemporaneously effect axial displacement toward each other of adjacent sections of two adjacent thread convolutions in the complementary threaded member so as to increase resistance of the engaged thread areas to relative rotation, each of said rigid thread shifting sections and the thread portion from which it is offset presenting in combined transverse cross-section an area greater than the cross-sectional area of the normal thread convolution.

4. A self-locking screw threaded device including a threaded body, and a locking portion including a rigid thread shifting section in the form of a bulge extending out of normal helical contour of a thread convolution of the body and a second adjacently positioned rigid thread shifting section in the form of a bulge on an alternately positioned thread convolution extending out of normal helical contour of its companion thread convolution in a direction toward the first mentioned bulge, a portion at least of the crown of the thread convolution intermediate said alternate convolutions being depressed in the vicinity of said bulges, said bulged portions adapted when rotatably associated with a complementary threaded member to contemporaneously effect axial displacement toward each other of adjacent portions of adjacent thread convolutions in said complementary member so as to increase resistance of the engaged thread areas of relative rotation.

RICHARD T. HOSKING.